Nov. 22, 1966 R. WALKER 3,286,898

MAGNETIC TAPE RECORDERS

Filed Oct. 6, 1964 2 Sheets-Sheet 1

INVENTOR.
RONALD WALKER
BY
Kurt Kelman
AGENT

Nov. 22, 1966 R. WALKER 3,286,898

MAGNETIC TAPE RECORDERS

Filed Oct. 6, 1964 2 Sheets-Sheet 2

INVENTOR

RONALD WALKER

United States Patent Office 3,286,898
Patented Nov. 22, 1966

3,286,898

MAGNETIC TAPE RECORDERS

Ronald Walker, Norton, Stourbridge, England, assignor to BSR Limited, Old Hill, England, a British company Filed Oct. 6, 1964, Ser. No. 402,029
Claims priority, application Great Britain, Oct. 10, 1963, 39,922/63
5 Claims. (Cl. 226—188)

This invention relates to sound recording and play-back apparatus utilising magnetic tape and of the type now commonly known as "tape-recorders" wherein the tape is passed from one to another of two rotatable spools and past an assembly of transducer and erasure heads.

This invention is concerned particularly with a tape-recorder of the type (hereinafter referred to as the type specified) in which the tape is drawn past the assembly of transducer heads by its engagement between a spindle (called a capstan spindle) and a pinch roller, the capstan spindle being fixed to a relatively larger diameter disc (called the capstan disc) which is driven from the spindle of the electric motor of the apparatus by a jockey pulley adapted to be selectively engaged with an appropriate one of a number of different diameter drive pulleys on the spindle of the electric motor to vary the speed of transport of the tape. Generally there are three speeds but there may be more or less.

The object of the invention is to provide an improved means for changing the speed of transport of the tape.

According to the invention we provide a tape-recorder of the type specified wherein the drive from the motor spindle is transmitted to the capstan spindle, which is rotatable about an axis parallel to the motor spindle, through a jockey pulley, when the periphery thereof is in engagement with one of a number of driving pulleys on the motor spindle and also in engagement with the capstan disc, said jockey pulley being mounted upon a pivoted arm which is spring loaded and so arranged as to urge the jockey pulley into engagement with the capstan disc at all times, said arm being operated upon by a cam having two profiles, one of which causes movement of the arm to swing the jockey pulley out of engagement with the currently engaged pulley on the driving motor spindle, and the other of which causes movement of the arm in the direction of its pivotal axis to shift the jockey pulley into register with another of the pulleys on the driving motor spindle.

Heretofore, and for the remainder of this specification, the apparatus is described as though the tape-recorder were occupying a normal position on a horizontal surface with the spindles of the spool carriers in vertical positions, but this is only for the purposes of clarity in the description as it will be appreciated that such apparatus is capable of functioning with the tape deck at an angle to the horizontal plane or with the tape deck in a vertical plane, in which latter case the spindles of the spool carriers would be horizontal.

The jockey pulley may be mounted on one arm of a two-arm lever which is pivotally mounted about a pivotal axis at the junction of its two arms, and the other arm of the two may have attached thereto one end of a spring, the other end of which is anchored to the tape-deck so as to urge the jockey pulley into engagement with the capstan disc.

The aforesaid two-arm lever may be pivoted at one end of a swinging arm pivoted on the tape-deck about a vertical axis, the spindle upon which such swinging arm is pivoted being spring pressed upwardly and there may be provided a two-profile cam adjacent said swinging arm arranged so as to have a face profile which acts on a projecting follower portion of the swinging arm to swing it in a horizontal plane and an edge profie acting on top of the swinging arm to move it downwardly against the spring pressure. The face profile of the cam may have a number of high spots arranged so as to act upon the swinging arm to swing the jockey pulley right out of engagement with the pulleys on the driving motor spindle before the edge cam profile operates to shift the swinging arm up or down.

In one embodiment the invention may be applied to a tape-recorder having an arrangement of controls and spool carriers, as described in our co-pending application No. 402,025 of even date herewith, and having an automatic cut-off switch and braking arrangement as described in our further co-pending application No. 402,026 and No. 402,027 of even date herewith.

In the following description of such embodiment, given with reference to the accompanying drawings, only those parts essential to an understanding of the invention are shown and described and for a full description of the tape-recorder reference should be made to the said co-pending applications.

Figure 1:
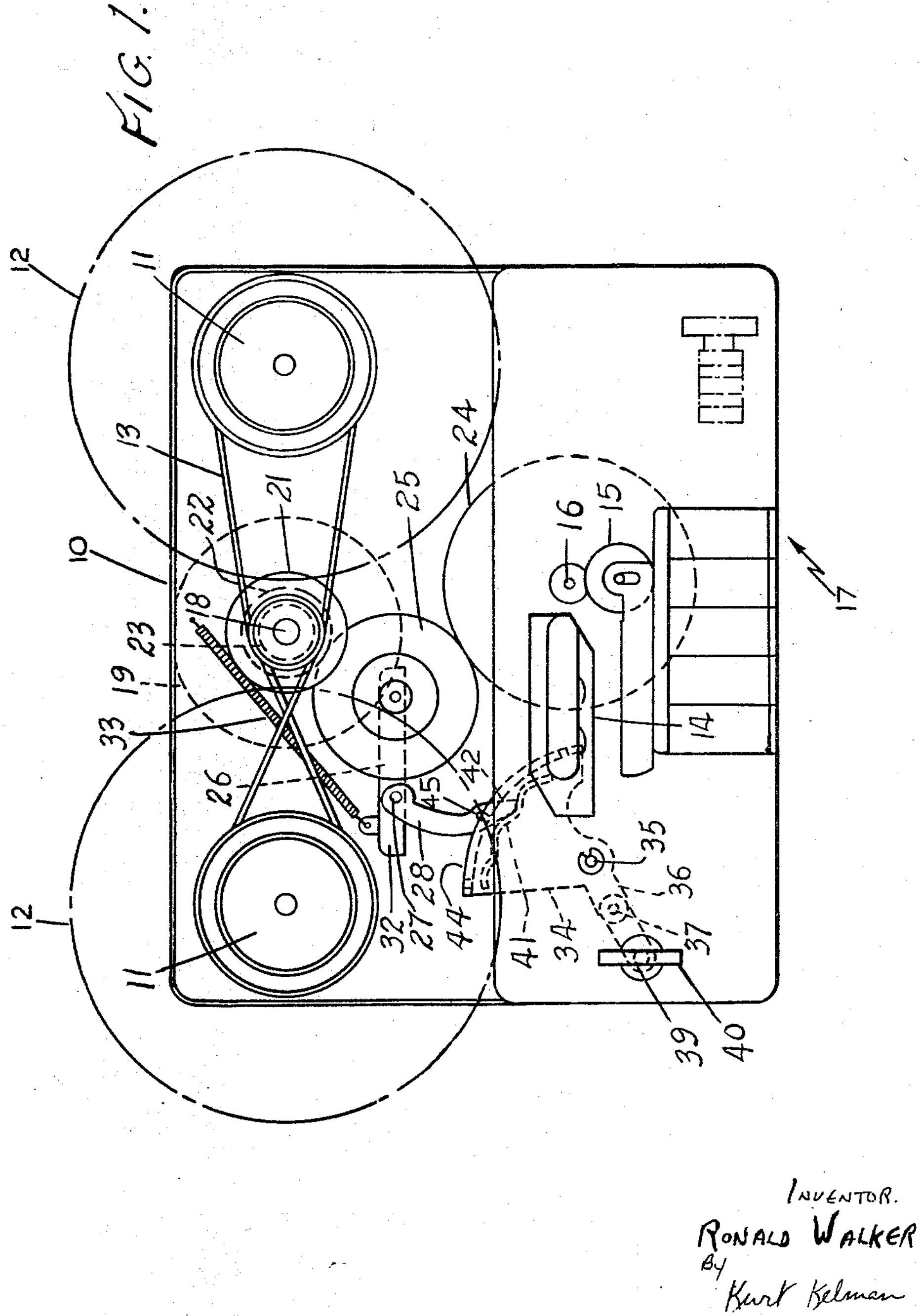
FIGURE 1 is a plan view.
Figures 2, 3:
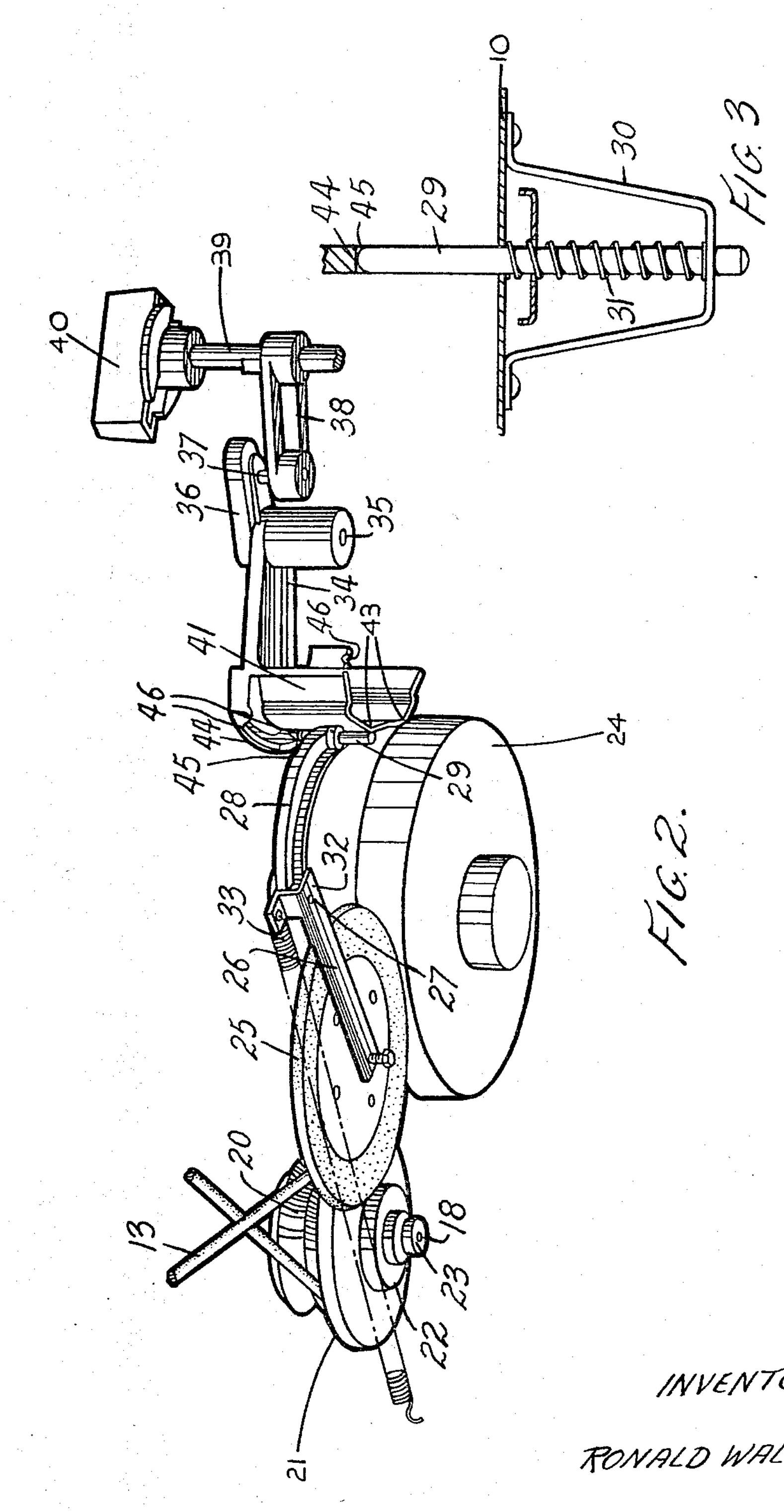
FIGURE 2 is an underneath perspective view.
FIGURE 3 is a detail view of part of the mechanism.

In FIGURE 1 there is shown the base plate or tape deck 10 upon which is mounted the spool carriers 11 for the spools of tape 12, these being driven by the bolt 13. Also shown is the assembly of transducer heads 14 past which the tape is drawn by the co-operating engagement of the pinch roller 15 and driven capstan spindle 16 (the pinch roller being here shown retracted). The apparatus also includes a bank of control finger levers 17.

In applying the present invention to this arrangement the spindle 18 of the driving motor 19, which is mounted on the underside of the tape-deck and from which the spindle 18 projects upwardly, has the double pulley arrangement 20 on its upper end, and is provided below said double pulley 20 with a series of three driving discs 21, 22, 23 of different diameter and disposed one above the other, the larger disc 21 being uppermost. The capstan spindle 16 which is spaced from and parallel to the driving motor spindle 18 has the usual large capstan disc 24 secured thereto and a rubber covered jockey pulley 25 is arranged intermediate the capstan spindle and driving motor spindle and in the manner described hereinafter is normally held so as to be in engagement with the capstan disc 24 and with one or the other of the three driving discs on the motor spindle.

The jockey pulley 25 is rotatably mounted on the end of one arm 26 of a two-arm lever and this lever is pivotally mounted at the junction 27 of its two arms at the outer end of a curved swinging arm 28 which at its inner end is fixed to a vertical spindle 29 supported in the tape-deck. This vertical spindle passes downwardly below the tape-deck through a U-shaped yoke 30 fixed to the underside of the tape deck and a spring 31 acts between the base of this yoke and a washer on the vertical spindle 29 so as to urge the vertical spindle 29 upwardly.

The other arm 32 of the two-arm lever projects in a direction away from the capstan disc and has attached thereto one end of a spring 33, the other end of which is anchored to the tape-deck so as to pull this arm 32 in such a direction as always to urge the jockey pulley 25 into engagement with the capstan disc 24. There may be a number of alternative positions on this arm 22 and/or on the tape deck for the attachment of the spring 33 so that the spring pressure urging the jockey pulley into engagement can be varied.

Adjacent the pivotal mounting of the swinging arm 28 there is mounted upon the tape-deck a swinging cam 34 having a double profile, this cam being in the form of a quadrant which is pivoted on the tape-deck about a vertical axis 35, and has an integral arm 36 pivotally connected by a pin 37 to an operating arm 38 fixed to an operating spindle 39 mounted in the tape deck and having an operating knob 40 on its upper end. Turning the knob 40 pivots the cam 34 about its axis 35.

The cam 34 has a face profile 41 which is engaged by a projecting follower portion 42 on the end of the swinging arm 28, which projects beyond its pivotal axis on the side remote from the pivot 27, and the face profile 41 determines the angular position of the arm 28, there being two high spots 43 on this face profile adapted to engage the follower portion 42 and move this rapidly through a substantial arc to cause the arm 28 to swing the jockey pulley well clear of the driving discs on the motor spindle 18.

At the edge of the quadrant the cam 34 has a downwardly projecting flange 44 which provides an edge profile engaging the upper end 45 of the spindle 29 which projects above the upper face of the swinging arm 28, and this edge profile is shaped so that, as the cam 34 is swung from one extreme position to the other, it forces the spindle 29 of the swinging arm 28 downwardly against the pressure of the spring 31, or allows the spindle to rise vertically under pressure of spring 31 depending upon which direction the cam is moving. The upper end 45 of the spindle is of semi-spherical form to reduce friction to a minimum and this ensures that the swinging arm 28 is fully responsive to any deviation which might occur due to eccentricities in the capstan or driving motor pulleys or movement of the motor upon its rubber mountings.

The profiles 41 and 44 on the cam are so arranged in relation to one another that the high spots 43 on the face profile operates to swing the jockey pulley 25 well clear of the driving discs of the motor spindle before the edge profile operates to cause vertical up or down shifting of the swinging arm to move the jockey pulley up or down to register with the selected one of the driving discs on the motor spindle.

The swinging arm is non-positively located in one or the other of its three operative positions by the upper end 45 of the spindle 29 engaging in one or the other of three notches 46 in the edge profile of the cam.

The arrangement whereby the jockey pulley 25 is mounted on the one arm 26 of the two-arm lever 26, 32 which is pivoted on the outer end of the swinging arm 28 provides that the extension, during working, of the spring 33 which acts on the other arm 32 of the lever is much less than is the case where the jockey pulley is on the end of a swinging arm and a spring acts directly on such swinging arm. The present arrangement leads to simplification of the lay-out of the parts on the tape deck.

What I claim then is:

1. In a tape recorder of the type specified having a capstan spindle and co-operating pinch roller between which the tape is engaged, a capstan disc fixed to the capstan spindle, an electric driving motor spindle having thereon a number of different diameter drive pulleys and a jockey pulley, the jockey pulley being selectively engageable with one or another of said drive pulleys and also engageable with said capstan disc; the arrangement comprising a swinging arm fixed upon a vertical spindle for pivoted movement about the axis thereof, spring means urging said spindle upwardly, a two-arm lever pivotally mounted about the junction of its two arms at the one end of said swinging arm, the jockey pulley being mounted on one of said arms, a spring connected at its one end to the other one of said two arms and at its other end to a fixed point, and urging the jockey pulley into engagement with the capstan disc, and a cam having two profiles engaged by said swinging arm, one profile causing swinging movement of said arm to disengage the jockey pulley from the driving motor spindle and the other profile causing vertical movement of the swinging arm to shift the jockey pulley in the axial direction.

2. A tape recorder according to claim 1 wherein the two profile cam has a face profile which acts on a projecting follower portion of the swinging arm to swing it in a horizontal plane and an edge profile acting on top of the swinging arm to move it downwardly against the spring pressure.

3. A tape recorder according to claim 2 wherein the face profile of the cam has a number of high spots arranged so as to act upon the swinging arm to swing the jockey pulley right out of engagement with the pulleys on the driving motor spindle before the edge cam profile operates to shift the swinging arm up or down.

4. A tape recorder according to claim 2 wherein the edge profile of the cam acts upon the upper end of the spindle to which the swinging arm is fixed and such edge profile has a number of notches corresponding in number to the number of driving pulleys on the motor spindle and adapted to engage the upper end of said swinging arm spindle to locate it non-positively in one or the other of the operative positions of the swinging arm.

5. A tape recorder according to claim 2 wherein the cam has an integral projecting arm which is pivotally connected to a pivoted operating arm, the latter being adapted to be manually operated to move the cam angularly for operating the swinging arm.

References Cited by the Examiner

UNITED STATES PATENTS

| | | | |
|---|---|---|---|
| 2,927,743 | 3/1960 | Shatavsky | 242—55.12 |
| 2,983,794 | 5/1961 | Shields | 74—190 X |
| 3,138,031 | 6/1964 | Brualdi | 74—190 |

FOREIGN PATENTS

| | | |
|---|---|---|
| 556,046 | 4/1957 | Belgium. |

M. HENSON WOOD, Jr., *Primary Examiner.*

J. N. ERLICH, *Assistant Examiner.*